April 1, 1941.  H. G. KLEMM  2,236,573
AIRCRAFT CONSTRUCTION
Original Filed Dec. 5, 1936   3 Sheets-Sheet 2
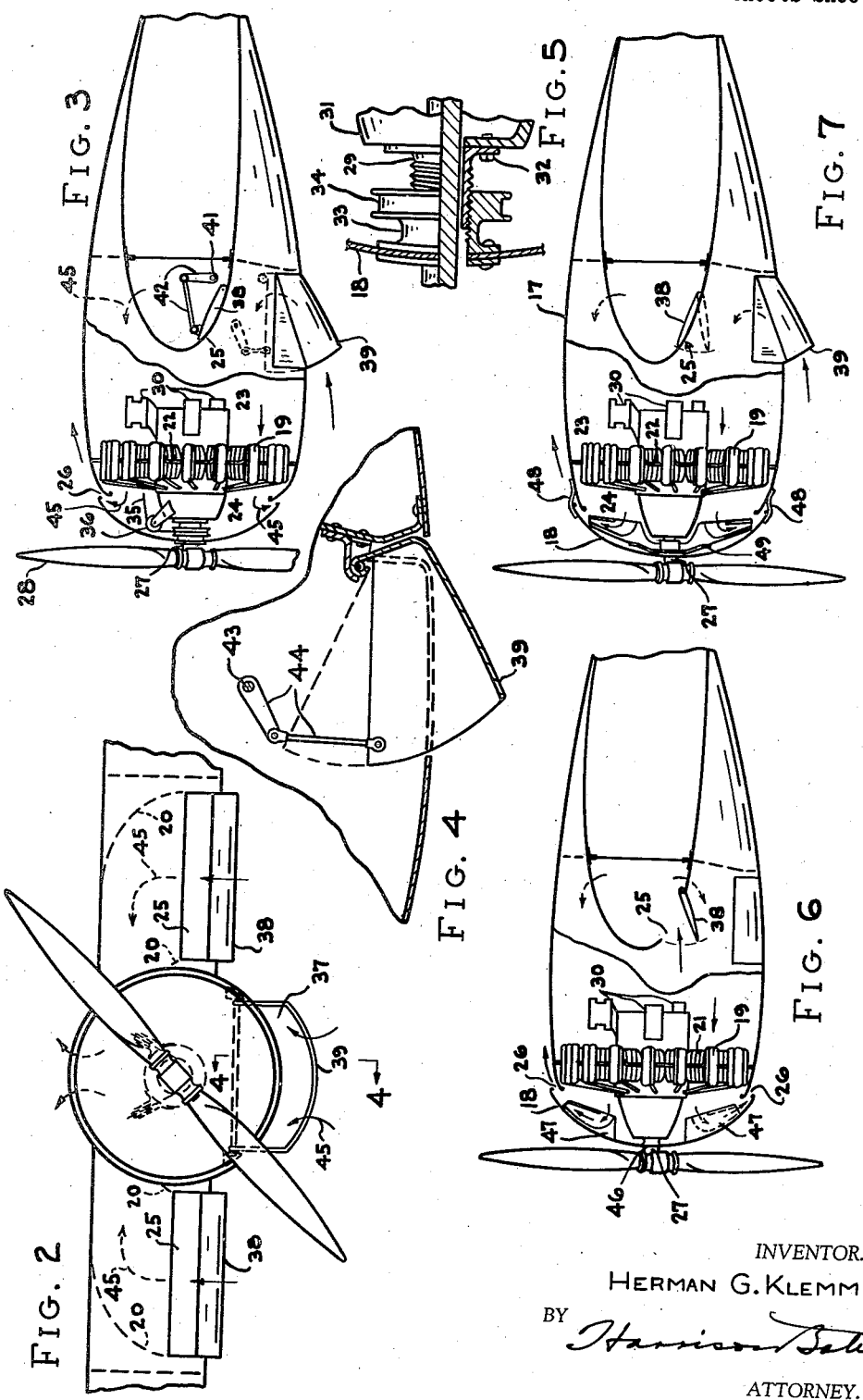
INVENTOR.
HERMAN G. KLEMM
BY
ATTORNEY.

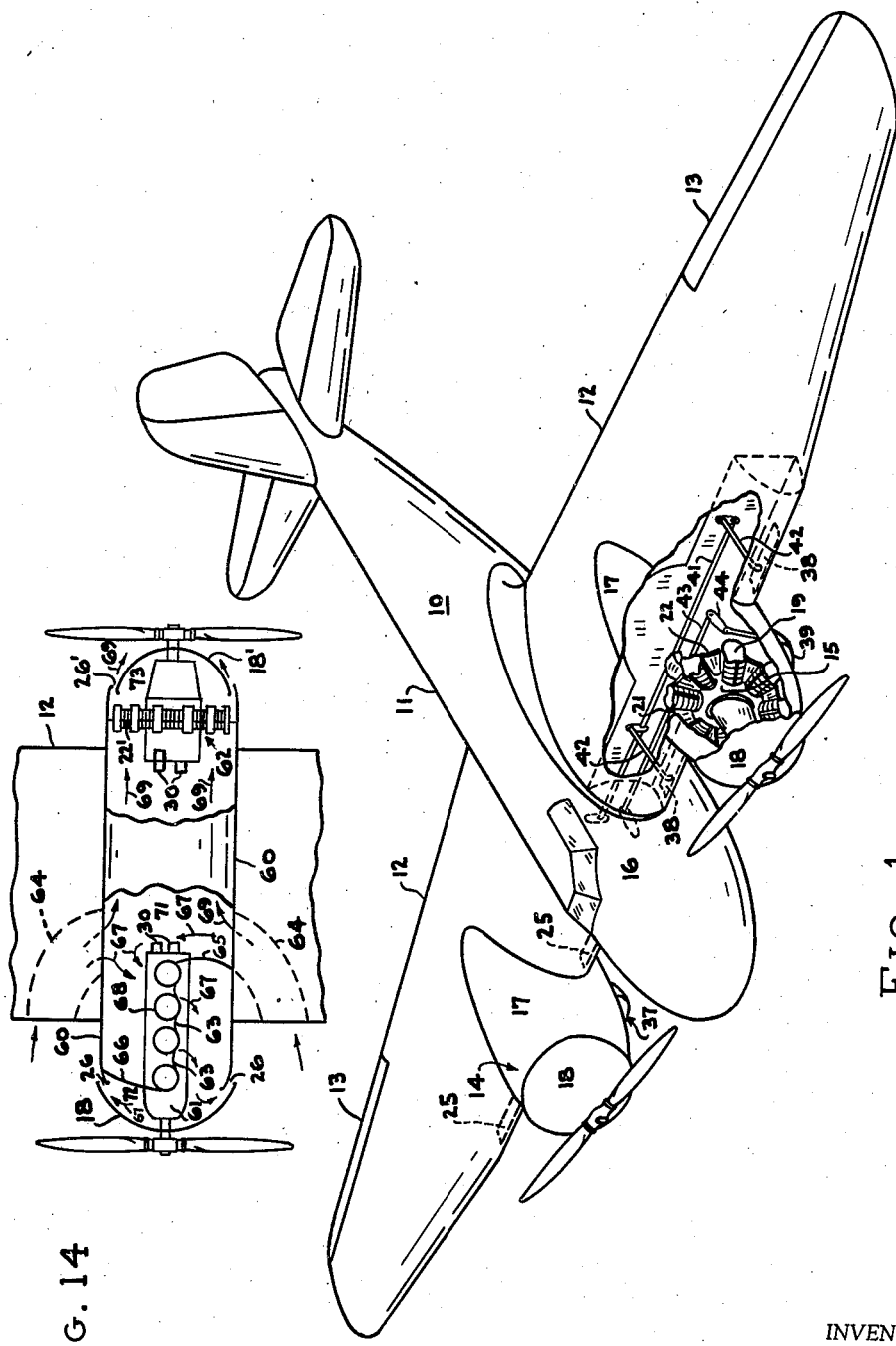

April 1, 1941.  H. G. KLEMM  2,236,573
AIRCRAFT CONSTRUCTION
Original Filed Dec. 5, 1936  3 Sheets-Sheet 3
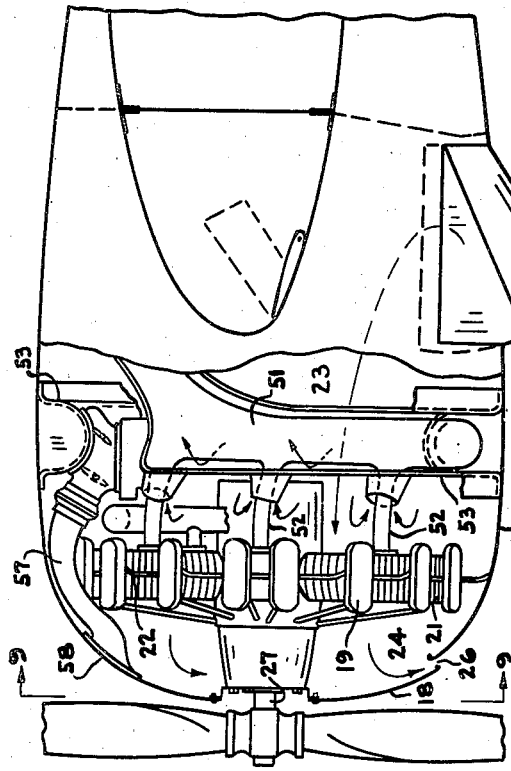
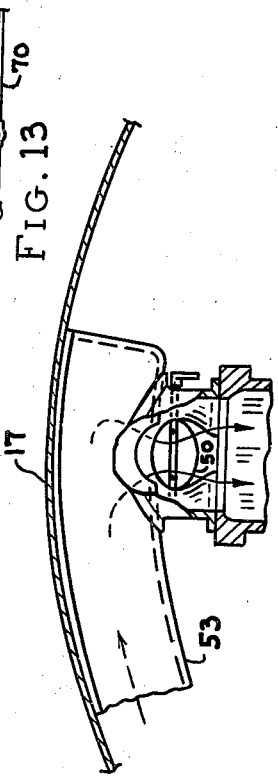
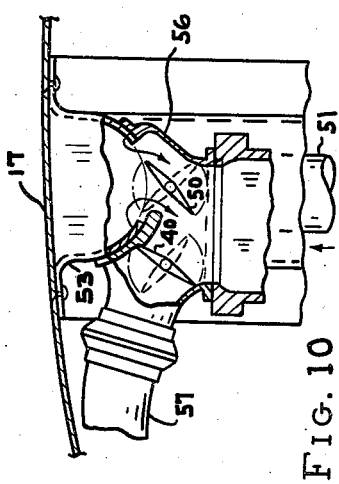
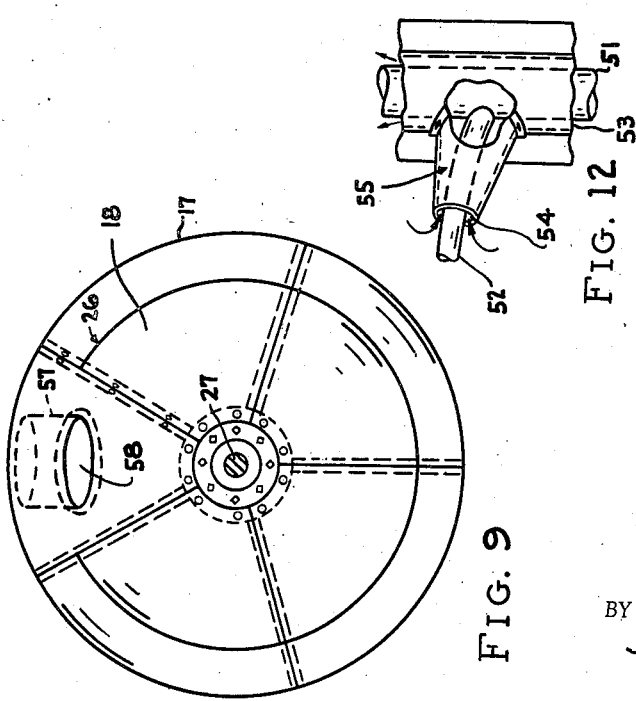
INVENTOR.
HERMAN G. KLEMM
BY
ATTORNEY.

Patented Apr. 1, 1941

2,236,573

UNITED STATES PATENT OFFICE 2,236,573

AIRCRAFT CONSTRUCTION

Herman G. Klemm, Kingsville, Md., assignor to The Glenn L. Martin Company, Baltimore, Md.

Original application December 5, 1936, Serial No. 114,320. Divided and this application October 30, 1940, Serial No. 363,557

9 Claims. (Cl. 244—53)

This invention relates to aircraft construction and more particularly to an improved system for controlling the air utilized in the cooling system as well as that supplied to the intake of the engine carburetor.

This application is a division of my application S. N. 114,320, filed December 5, 1936, through my application S. N. 285,937, filed July 22, 1939.

Various constructions and means have been heretofore proposed for controlling the air utilized in connection with the cooling system of an internal combustion engine, but all such constructions known to me are undesirable in one way or the other. For instance in the cooling of the heated surfaces of the engine and the engine accessories such as generators, magnetos, pumps, and the like, it has been the general practice to employ separate air ducts for cooling the engine and the accessories, the latter is contacted with the cooling air after it has been heated by the heat generating surfaces of the engine. In those constructions employing separate air ducts or cooling means for each the engine and the accessories, the system is not only complicated, but requires additional material, and consequently objectionable weight to provide these separate systems, while in those employing a single system, the cooling air initially contacts the heated surfaces of the engine and when this air reaches the accessories it has already been heated to such an extent that it is of little use in cooling the accessories. Also these air cooling systems heretofore employed, particularly in connection with aircraft, are lacking in suitable means for controlling the air pressure in the compartments containing surfaces to be cooled.

It has heretofore been suggested or proposed to cool an engine by circulating air in a reversed direction than that employed in the conventional construction of today. As is well known, in the conventional construction the cooling air enters at the front of the engine and passes rearwardly through the engine enclosure and is expelled at some point rearwardly of the engine. Those proposed constructions for placing the entrance of the air rearwardly of the engine and expelling it forwardly of the engine have been proposed in connection with unbaffled engines and have not been adequate to overcome the difficulties set out above. Consequently, these previously proposed reverse flow structures are inoperable. However, I have discovered that, if an engine, particularly of the radial type, is baffled between the cylinders in such a manner as to restrict the passage of the air between the cylinders to spaces defined by the cooling fins, it is practical to employ a reverse flow of air through the engine. Not only is the engine adequately cooled on the ground as well as in flight, but I am able to employ high pressure cooling air initially for adequately cooling the engine accessories. Further the present structure renders it possible to provide different air pressures in different compartments of the aircraft so that the inlet to the carburetor can be located in a high pressure area.

It is one object of this invention to provide an aircraft so constructed as to overcome the above difficulties.

Another object is to provide an aircraft construction that will initially supply high pressure cooling air to the engine accessories and thereafter direct such air into contact with the surfaces of the engine to be cooled.

Another object is to provide in an aircraft construction novel means for controlling the pressure of the air utilized for cooling the various surfaces desired to be cooled.

Another object is to provide in an aircraft construction novel means for supplying cooling air to different compartments of the aircraft so as to maintain different air pressures in the several compartments.

Another object is to provide in an aircraft construction, having the above characteristics, novel means for controlling the drag set up by the cooling air passing through the aircraft compartments.

Another object is to provide in an aircraft construction, having the above characteristics, novel means for uniformly cooling the apparatus located in the several compartments of the aircraft as well as providing uniform pressure distribution of the air supplied to certain of the compartments where greater or lesser air pressure is desired.

Another object is to provide in an aircraft construction novel means for supplying air to the intake of an engine carburetor so as to deliver the air to the carburetor at a desired pressure as well as at a predetermined temperature.

A further object is to provide in the cooling system of an aircraft a novel arrangement and construction of parts that will obtain the cooling air from points along the aircraft surfaces where the air velocity is lowest and the aerodynamic pressure is greatest and expel the used cooling air at points on the surface of the aircraft where the velocity of the surrounding air is greatest and the aerodynamic pressure is least.

A still further object is to provide an aircraft so constructed as to receive and expel cooling air employed in the cooling system thereof that will reduce the air drag through the aircraft to a minimum as well as render little or no objectionable interference with the slipstream of the aircraft.

Still another object is to provide an aircraft engine cooling system which will cool the engine adequately when the aircraft is standing on the ground as well as when it is in flight.

The above and other objects will be made apparent through the further description of the invention when taken in connection with accompanying drawings wherein like reference characters refer to like parts. It is to be distinctly understood that the drawings are not a definition of the invention, but are merely illustrations of certain forms by means of which the invention may be effectuated. The scope of the invention will be defined by the appended claims.

In the drawings:

Figure 1 is a perspective view of an aircraft embodying the invention having a portion broken away for illustrative purposes.

Figure 2 is a front elevational view of one of the power plants shown in Figure 1 together with the adjacent surfaces of the aircraft.

Figure 3 is a side elevational view of Figure 2 having a portion broken away for illustrative purposes.

Figure 4 is a fragmentary detail view taken along 4—4 of Figure 2.

Figure 5 is an enlarged view partly in section of the embodiment shown in Figure 3.

Figure 6 is a view similar to Figure 3, illustrating still another embodiment of the invention.

Figure 7 is a view similar to Figures 3 and 6 illustrating still another embodiment of the invention.

Figure 8 is an enlarged view similar to Figure 6 illustrating another embodiment of the invention.

Figure 9 is a sectional view taken along the line 9—9 of Figure 8.

Figures 10 and 11 are enlarged detail views taken at right angles one to the other of the embodiment shown in Figure 8.

Figures 12 and 13 are enlarged detail views of separate parts of the embodiment shown in Figure 8, and Figure 14 is a top plan view of a dual power unit having a portion broken away for illustrative purposes and illustrating another embodiment of the invention.

Referring to the drawings, Figure 1 illustrates one type of an aircraft represented in its entirety by 10. This particular type of aircraft is known as a bi-motored monoplane and comprises a fuselage 11, a wing 12 having thereon among other things the usual ailerons and two power plants 14 and 15 mounted in spaced relation on the forward framework of the wing 12, these engines being positioned on opposite sides of the fuselage 11. While it has been elected to describe the present invention in connection with a bi-motored monoplane, it is to be distinctly understood that the invention is equally adapted for use with any type of aircraft employing a single engine or any number of engines.

The forward portion of the fuselage which will hereinafter be referred to as a body nacelle 16 is streamlined in form for the conventional reasons, while each of the engines are enclosed within an engine nacelle 17 and a forward cowling 18, the latter being, for the purpose of this invention, referred to as a nose cowling 18.

Engine 15 is of the radial type having a plurality of radially extending cylinders 19. Each of these cylinders is provided with cooling fins 21 and between adjacent cylinders 19 are positioned baffles 22. The engine 15 and the baffles 22 together form a partition within the engine nacelle 17 and define a closed rear compartment 23 and a front compartment 24.

The baffles 22 are so positioned between the adjacent cylinders as to deflect the cooling air for the engine in direct contact with the heated surfaces of the several cylinders 19. In fact the baffles are so positioned as to restrict the air passage through the engine to those spaces defined by the cooling fins 21.

In order to provide a novel cooling system for the engine 15 and for the engine accessories 30 such as generators, magnetos, pumps and the like I employ baffled engines together with means on the surface of the aircraft for taking in or scooping up cooling air and directing it forwardly through the engines and thereafter releasing it to the surrounding medium. However, in order to provide such means which will supply sufficient cooling air without seriously interfering with the aerodynamic lifting surfaces, it is important that the entrance of the cooling air be taken at points on the aircraft surface or surfaces where the velocity of the air is smallest and the aerodynamic pressure is the greatest and correspondingly this cooling air must be released from the aircraft at points on the aircraft surfaces where the velocity of the slipstream or air surrounding such surfaces is the greatest and the aerodynamic pressure is the least. By utilizing the combination of these characteristics together with others later to be described, I am able to contact the engine accessories 30 with the cooling air initially and thereafter to employ this same air for satisfactorily cooling the heated surfaces of the engine.

By employing the baffled engine 15 to partition the engine nacelle 17 into fore and aft compartments, I am able to establish and control separate air pressures in each of these compartments 23 and 24. In one of the preferred forms of the invention, the cooling air is received adjacent the leading edge of the wing 12 and preferably at points on each side of the engine nacelle 17 and adjacent thereto as in the wing surface, as shown at 25. Suitable leakproof air ducts 20 or the like (see Figure 2) are provided for connecting the entrance of the openings 25 with the compartment 23 which is behind the engine and contains the accessories 30. Inasmuch as the openings 25 are located at a point below and adjacent to the leading edge of wing 12, where the aerodynamic pressure is the greatest, it follows that the air will be forced into the rear compartment 23 continuously and with a ramming force. Now in order to direct the cooling air properly from the rear compartment 23 through the baffled engine into the front compartment 24 and thereafter release it to the medium, I employ the nose cowling 18. In the form of the nose cowling employed in Figures 1 to 5, inclusive, the cowling is positioned forward of the nacelle 17 and arranged to provide a Venturi opening 26 between the rear edge of the cowling 18 and the adjacent front or forward portion of the nacelle 17. The slipstream of the propeller, or the relative wind during motion of the aircraft through the air, will set up a Venturi action at the outlet 26. This Venturi action will tend to expel the air from the forward compartment 24 and consequently reduce the pressure therein as compared to the pressure in the rear compartment 23 set up by the ramming effect of the incoming air.

In order to control the Venturi action of the opening 26 as well as to control the pressure in the compartments 23 and 24, novel means is provided for adjusting the cowling 18 longitudinally of the propeller shaft 27. The propeller shaft carries thereon a propeller 28, the latter being positioned forwardly on the cowling 18. The means for moving the cowling 18 longitudinally of the propeller shaft 27 comprises an externally threaded tubular member 29 positioned about the propeller shaft 27 and fastened to the engine block 31 (see Figure 5). The threaded member 29, which is held rigidly to block 31 by suitable means shown at 32 is provided with a threaded member 33 carried thereon. The member 33 is adapted to support the cowling 18 and is also formed to provide a pulley 34 for receiving and cooperating with a belt or cord 35 positioned over an idle pulley 36 (see Figure 3), the latter being turnably mounted at any suitable place such as the engine block 31. The belt or cord is operably connected to controls (not shown) for use either manually or automatically for adjusting the opening 26 for increasing or decreasing the Venturi effect set up by the slipstream passing by and over the adjacent surfaces to the opening 26 and adjusting the inlet opening 25 correspondingly with the outlet 26. Another important feature of this arrangement is that the intake to the carburetor manifold is desirably positioned within the rear compartment 23 where a positive pressure is maintained by the ramming effect of the cooling air. This, in effect supercharges the engine without requiring any special mechanism therefor. In addition to the openings 25, there may be provided another air intake efficiently positioned in the bottom of the engine nacelle 17, as shown at 37.

In order to control or regulate the amount of cooling air entering the openings 25 or 37, suitable shutters 38 and a scoop 39, respectively, are provided and these shutters 38 and scoop 39 are preferably operated separately. Figure 1 shows an operating rod 41 connected to links 42 arranged to actuate the shutters 38 while there is a separate rod 43 provided with link connections 44 for actuating the scoop 39. The purpose of separately controlling the openings 25 and 37 is that either the openings 25 or 37 may be required to intercept sufficient air from the slipstream of the propeller when the aircraft is at rest on the ground. It is to be understood that either or both of these shutter controls may be either manually operated by the pilot or thermostatically controlled from the heated surfaces desired to be cooled. The arrows 45 indicate the direction of the air flow into the openings 25 and 37 through the compartments 23 and 24 by way of the baffled engine 15. Figure 6 illustrates an embodiment of the invention wherein the cowling 18 is supported by and turnable with the propeller shaft 27. The cowling 18 is rigidly fixed to propeller shaft 27 as shown at 46. In this particular embodiment the inner surface of the cowling 18 carries impelling blades 47. These impeller blades are here employed to augment the Venturi action of the opening 26 and assist in the circulation of the cooling air through the engine as well as to maintain a reduced pressure in the forward compartment 24 as compared to that maintained in the rear compartment 23.

Figure 7 illustrates still another embodiment of the invention wherein the cowling 18 is supported in rigid fixed relation with the engine nacelle 17 or the body nacelle 16, as the case may be, by clips 48, while the propeller shaft 27 is provided with an impeller 49 rigidly fixed thereon and turnable therewith. The purpose and function of the impeller 49 is similar to that described in connection with the impeller blades 47 carried by the rotatable cowling 18 in Figure 6.

Figures 8 to 13 inclusive, illustrate still another embodiment of the invention wherein means are provided for supplying air to the intake of the carburetor manifold at predetermined selected temperatures. In this embodiment, 51 indicates an exhaust ring or manifold, this exhaust ring 51 being operably connected with the cylinder 19 by the exhaust pipes 52. The exhaust ring 51 is enclosed by a manifold-like covering 53 and provides an annular shaped exhaust ring compartment. Figure 12 is a detail illustration showing the manner in which the air for cooling the exhaust is supplied from the positive pressure compartment 23. The air enters the exhaust manifold or covering 53 by way of the annular openings 54 provided at the ends of separate housing structures 55 encircling the exhaust pipe 52 and connecting the interior of the rear compartment 23 with the interior of the exhaust covering 53. For the purpose of supplying heated air to the carburetor, the intake of the carburetor manifold is connected with the interior of the exhaust covering 53 by the way of a passageway or air duct 56 and also the intake of the carburetor manifold is connected with the air outside of the aircraft surfaces by way of a passageway or air duct 57.

The air duct 57 may lead to any desirable point such as an opening in the front end of the cowling 18 as shown at 58. When the opening 58 is positioned in the cowling 18, then a cowling of the stationary type, of course, is employed. However, this air duct may extend to other points on the aircraft. In order to supply either hot or cold air selectively to the intake of the carburetor, valves 40 and 50 are positioned in the air ducts 57 and 56, respectively. These valves 40 and 50 are preferably operated simultaneously one with the other by means of a common control 70 and, as shown, the valves are positioned in their respective air ducts so that when one air duct is closed the other is opened, or so that each of the air ducts may be partly opened. It is to be understood that the common control 70 may be operated either manually by the pilot or by automatic means associated with the manifold of the carburetor. Figure 14 illustrates still another embodiment of the invention wherein dual motors are employed. In this embodiment 60 indicates a common nacelle adapted to accommodate a forward in-line engine 61 and a rear engine 62 of the radial type. It is to be understood, however, that either or both of the engines may be of the radial type or of the in-line type. The nacelle 60 as here shown is carried by an aircraft wing 12 and the nacelle 60 is provided with a forward cowling 18 and a rear cowling 18'. The inner edges of the rear cowling 18' are positioned inwardly of the rear edges of the nacelle 60 in order to provide a Venturi opening 26', while the forward nacelle 18 encircles the forward end of the nacelle 60 and forms a Venturi opening 26 as described in connection with Figures 1 to 8, inclusive.

In this embodiment a single system is utilized for cooling both the forward motor 61 and the rear motor 62. The rear motor 62 is baffled as shown at 22' in the same manner as that described in connection with engine 15, while the in-line motor 61 is baffled between the cylinders as shown at 63. The cooling air enters the forward edge of the wing 12 by way of the air duct 64 and into the nacelle 60 intermediate the engines 61 and 62. The Venturi opening 26' associated with the rear cowling 18' operates to draw air through the baffled motor 62 while the Venturi opening 26 associated with the forward cowling 18 operates to draw air through the baffled engine 61 by way of the passageway defined by the partitions 65 and 66. Arrows 67 indicate the direction of the flow of the cooling air through and around the cylinders 68 of the in-line motor 61 and out the opening 26'. It can be understood that the compartment 71 between or intermediate the forward and rear engines 61 and 62, respectively, will be maintained at all times at a greater air pressure than the forward compartment 72 or rear compartment 73. The compartments 72 and 73 are defined by the baffled engines 61 and 62, respectively. The function of the cooling system in connection with this embodiment is similar to that described in connection with Figures 1 to 8, inclusive. The accessories 30 associated with each of the motors 61 and 62 are located within the compartment 71 and consequently are contacted by the cooling air before such cooling air contacts the heated surfaces of the engines. Means may be provided for supplying air to the intake of the carburetor manifolds (not shown) of the engines 61 and 62 in a manner similar to that described in connection with Figures 8 to 13, inclusive.

Accordingly, I have provided an aircraft of novel construction and arrangement of parts which provides among other things a novel cooling system for the interior of the aircraft having compartments of different air pressures, which pressures are controllable, novel means for supplying air to the carburetor at a desirable pressure as well as at a predetermined temperature, novel means for operating these features which are so constructed as to reduce the drag through as well as about the aircraft, and means which render it possible to cool an engine, whether in flight or on the ground, by the reverse flow of air therethrough, the latter producing the desirable feature of permitting the cooling air to contact the engine accessories initially. The present construction presents a finished aircraft wherein the cowling and the nacelle are clean in appearance and free of obstructions in the aerodynamic features of the aircraft. Also the cowled nacelle is so constructed as to protect the engine and accessories during flight from the weather and also eliminates the necessity of an engine cover when the craft is at rest. The engine cover is not only an additional requirement for an aircraft, but requires considerable time to assemble and disassemble on and from the engine. The present construction provides means whereby the air drag through the engine may be entirely eliminated by simply closing the openings 38 and 37, this feature being of great assistance in case an engine should become inoperable during flight. Further, these air entrances being adjustable may be readily operated to increase or decrease the volume of air supplied to the cooling system. As for instance, at high altitudes where the air is rarified the shutters or scoops associated with the openings may be adjusted to increase the ramming effect of the air in the aft compartment in order to supply the required pressure to the intake of the engine carburetor.

While I have illustrated and described certain forms by means of which the invention may be effectuated, it will now be apparent to those skilled in the art that certain changes, substitutions, modifications, additions, and omissions may be made in the several embodiments without departure from the spirit and scope of the appended claims.

I claim:

1. In aircraft comprising a power plant body mounted on and extending forwardly of a wing, said body including an engine to be cooled having a propeller beyond the nose of the body, nose cowling having a rearwardly directed air exit slot ahead of the engine, and conduits extending from the body, rearward of the engine, laterally within the wing beyond the sides of the body and having air entrance openings disposed at the wing leading edge and spaced from the body, said openings lying within a rearward projection of the propeller disc to receive propeller blast whereby cooling air flow into said openings, through said conduits and over the engine, is augmented.

2. In aircraft including a wing having an air entrance opening in its leading edge, a duct through the wing from said opening, an engine carried by the wing toward which air flowing through said duct is guided, and a propeller driven by said engine and disposed ahead of the wing and having an outer portion of its disc directly ahead of said opening.

3. In aircraft including a wing, a power plant carried thereby, a propeller driven by the power plant and disposed ahead of the wing leading edge, said wing leading edge having an air entrance opening directly behind an outer zone of the propeller disc, and duct means connecting said opening with the power plant for directing cooling air thereto.

4. In aircraft including a wing, a power plant carried thereby, a propeller driven by the power plant and disposed ahead of the wing leading edge, said wing leading edge having an air entrance opening directly behind an outer zone of the propeller disc, duct means connecting said opening with the power plant for directing cooling air thereto, and means to control the flow of air through said duct means.

5. In aircraft including a wing, a power plant carried thereby, a propeller driven by the power plant and disposed ahead of the wing leading edge, said wing leading edge having an air entrance opening directly behind an outer zone of the propeller disc, duct means connecting said opening with the power plant for directing cooling air thereto, and engine auxiliary devices adjacent the power plant also adapted to receive air from said duct.

6. In aircraft comprising a power plant body mounted on and extending forwardly of a wing, said body including an engine to be cooled having a propeller beyond the nose of the body, a nose cowling having a rearwardly directed air exit slot ahead of the engine, and conduits extending from the body, rearward of the engine, laterally within the wing beyond the sides of the body and having air entrance openings disposed at the wing leading edge and spaced from the body.

7. In aircraft, an engine nacelle having a wing extending laterally therefrom, the wing leading edge being rearward of the nacelle nose, an engine carried within the nacelle driving a propeller ahead of the nose whereby, in operation, air blast from the propeller washes over said nacelle and over portions of the wing leading edge adjacent the nacelle, said wing portions having leading edge air entrance openings, and conduits leading from said openings into said nacelle for conducting cooling air from said openings to the engine.

8. In aircraft, an engine nacelle having a wing extending laterally therefrom, the wing leading edge being rearward of the nacelle nose, an engine carried within the nacelle driving a propeller ahead of the nose whereby, in operation, air blast from the propeller washes over said nacelle and over portions of the wing leading edge adjacent the nacelle, said wing portions having leading edge air entrance openings, and conduits leading from said openings into said nacelle for conducting cooling air from said openings to the engine, said nacelle having an air exit opening through which air fed to the nacelle from said wing openings may issue from the nacelle.

9. In aircraft, a wing, an enclosed engine compartment mounted thereon having an air exit opening in a part thereof subject to low pressure during flight and forward of the wing, a conduit within the wing communicating with said compartment, and an air entrance opening rearward of said exit opening in a high pressure zone of the wing communicating with said conduit, said entrance openings being spaced from the exterior of said compartment to receive air undiluted by that which issues from said exit openings.

HERMAN G. KLEMM.